US009316329B2

(12) United States Patent
Bao et al.

(10) Patent No.: US 9,316,329 B2
(45) Date of Patent: Apr. 19, 2016

(54) HYDRAULIC HIGH PRESSURE VALVE CONTROLLER USING THE IN-SITU PRESSURE DIFFERENCE

(71) Applicants: Xiaoqi Bao, San Gabriel, CA (US); Stewart Sherrit, La Crescenta, CA (US); Mircea Badescu, La Canada Flintridge, CA (US); Yoseph Bar-Cohen, Seal Beach, CA (US); Jeffery L. Hall, South Pasadena, CA (US)

(72) Inventors: Xiaoqi Bao, San Gabriel, CA (US); Stewart Sherrit, La Crescenta, CA (US); Mircea Badescu, La Canada Flintridge, CA (US); Yoseph Bar-Cohen, Seal Beach, CA (US); Jeffery L. Hall, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 112 days.

(21) Appl. No.: 14/062,303

(22) Filed: Oct. 24, 2013

(65) Prior Publication Data
US 2014/0110612 A1    Apr. 24, 2014

Related U.S. Application Data

(60) Provisional application No. 61/718,063, filed on Oct. 24, 2012.

(51) Int. Cl.
*E21B 34/06* (2006.01)
*F16K 31/12* (2006.01)
*G05D 16/20* (2006.01)
*F16K 31/124* (2006.01)

(52) U.S. Cl.
CPC .............. *F16K 31/12* (2013.01); *E21B 34/06* (2013.01); *F16K 31/124* (2013.01); *G05D 16/20* (2013.01); *G05D 16/2006* (2013.01); *Y10T 137/7761* (2015.04)

(58) Field of Classification Search
CPC ....... E21B 34/06; F16K 31/12; F16K 31/124; G05D 16/20; G05D 16/2006
USPC ...................................................... 137/487.5
See application file for complete search history.

(56) References Cited

U.S. PATENT DOCUMENTS

| 8,453,723 B2 * | 6/2013 | Smithson ................ E21B 23/00 166/373 |
| 2013/0180711 A1 * | 7/2013 | Barrilleaux ............. E21B 34/08 166/250.01 |

FOREIGN PATENT DOCUMENTS

| GB | 2297568 A * | 8/1996 | ............. E21B 23/04 |
| WO | WO 0013858 A1 * | 3/2000 | ............. G05D 16/20 |

* cited by examiner

*Primary Examiner* — Eric Keasel
*Assistant Examiner* — Richard K Durden
(74) *Attorney, Agent, or Firm* — Milstein Zhang & Wu LLC; Joseph B. Milstein

(57) ABSTRACT

A hydraulic valve controller that uses an existing pressure differential as some or all of the power source for valve operation. In a high pressure environment, such as downhole in an oil or gas well, the pressure differential between the inside of a pipe and the outside of the pipe may be adequately large to drive a linear slide valve. The valve is operated hydraulically by a piston in a bore. When a higher pressure is applied to one end of the bore and a lower pressure to the other end, the piston moves in response to the pressure differential and drives a valve attached to it. If the pressure differential is too small to drive the piston at a sufficiently high speed, a pump is provided to generate a larger pressure differential to be applied. The apparatus is conveniently constructed using multiport valves, which can be rotary valves.

14 Claims, 9 Drawing Sheets

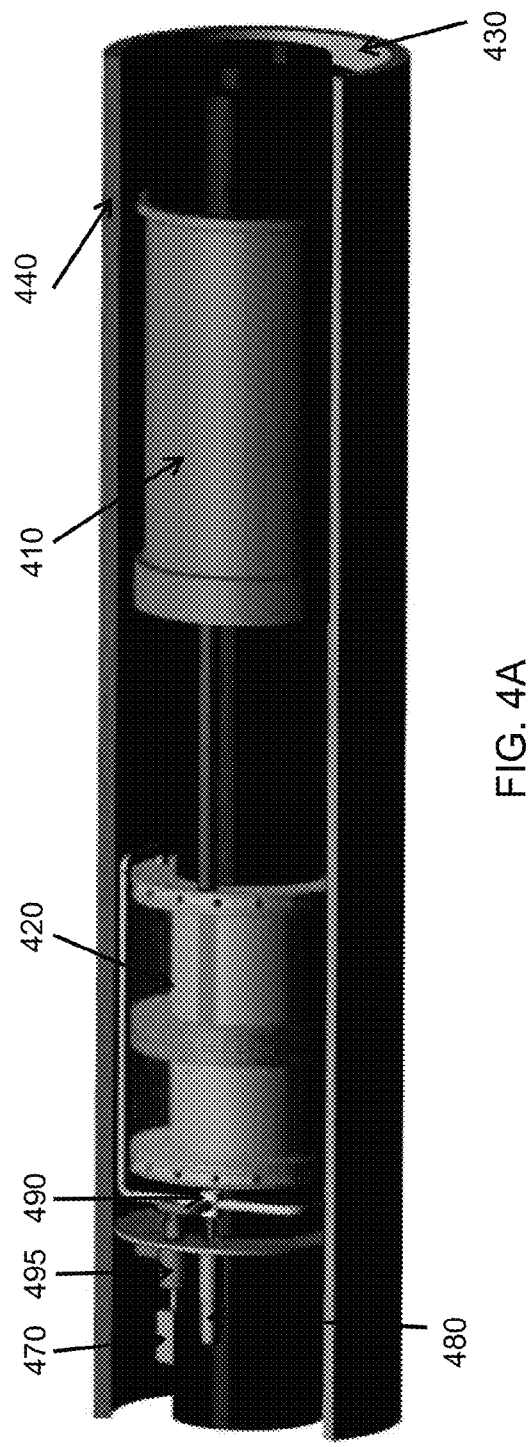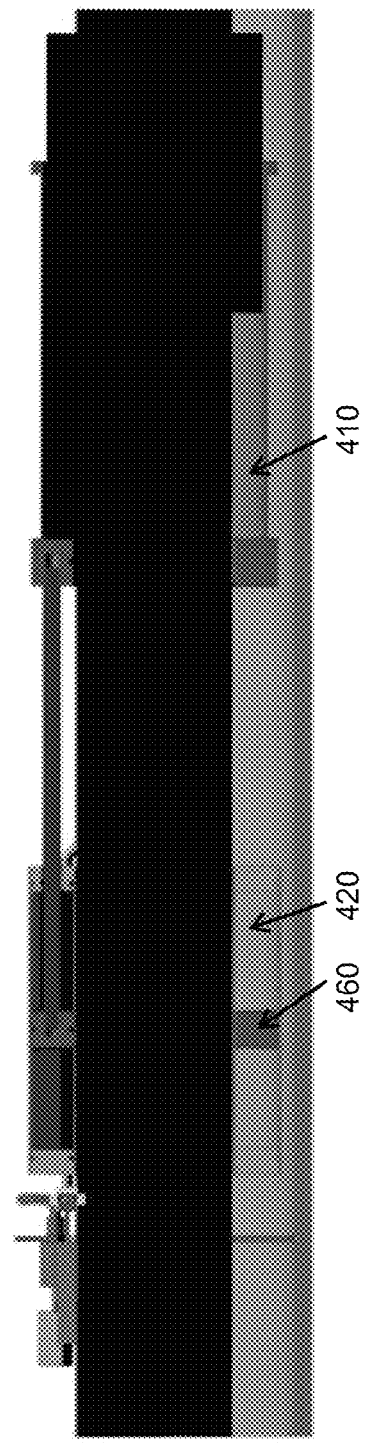

HYDRAULIC HIGH PRESSURE VALVE CONTROLLER USING THE IN-SITU PRESSURE DIFFERENCE

CROSS-REFERENCE TO RELATED APPLICATIONS

This application claims priority to and the benefit of U.S. provisional patent application Ser. No. 61/718,063 filed Oct. 24, 2012, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to valves in general and particularly to valves that operate under high pressure differentials.

BACKGROUND OF THE INVENTION

Various applications exist where high pressure valves are required. One of the major problems of control of such valves is that they have to move against a strong pressure differential that may require significant force, energy and large actuators.

In general, large force and high energy is required to control high pressure valves. For example, the force required for inserting or pulling the plug against the pressure in plug-valves or for sliding the gate on the hole-opening against friction in gate-valves is mainly proportional to the pressure difference. In cases where a sealing mechanism, e.g. gaskets or O-rings, is designed to secure a fully closing of the valve, the required normal pressure and the friction force that needs to be overcome in valve operation are increased with increase of the pressure difference.

There is a need for valve control systems that are more efficient than present valve control systems.

SUMMARY OF THE INVENTION

According to one aspect, the invention features a hydraulic valve control system for use in the presence of a pressure differential. The hydraulic valve control system comprises a primary valve connected to a primary valve actuator, the primary valve actuator configured to receive a primary valve connected to a primary valve actuator, the primary valve actuator configured to receive a first fluid having a first pressure at a port and a second fluid having a second pressure at another port, the difference between said first pressure and said second pressure defining a pressure differential, the primary valve actuator configured to respond to said pressure differential so as to actuate said primary valve; at least one secondary valve having fluid communication with said primary valve actuator, the first fluid and the second fluid, said at least one secondary valve configured to respond to a command to place said primary valve in any desired state ranging from a fully open state to a fully closed state by applying said pressure differential to said primary valve actuator so as to actuate said primary valve; and In one embodiment, the primary valve is a linear valve.

In another embodiment, the primary valve is a rotary valve.

In yet another embodiment, the primary valve actuator is at least one hydraulic cylinder.

In still another embodiment, one of the at least one hydraulic cylinder is annular in cross-section.

In a further embodiment, the primary valve actuator is at least one pneumatic cylinder.

In yet a further embodiment, one of the at least one pneumatic cylinder is annular in cross-section.

In an additional embodiment, the hydraulic valve control system is configured to be used in a downhole environment of an oil or gas well.

In another embodiment, a pump is located in fluid communication between the primary valve actuator and the secondary valve.

In yet another embodiment, the pump is located in fluid communication between the first or second fluid and the secondary valve.

In still another embodiment, the pump is located in fluid communication between two ports of the secondary valve.

In a further embodiment, the pump is located in fluid communication between two ports of the primary valve actuator.

According to another aspect, the invention relates to a method of controlling a valve in the presence of a pressure differential. The method comprises the steps of: providing a hydraulic valve control system, comprising: a primary valve connected to a primary valve actuator, the primary valve actuator configured to receive a first fluid having a first pressure at a port and a second fluid having a second pressure at another port, the difference between said first pressure and said second pressure defining a pressure differential, the primary valve actuator configured to respond to said pressure differential so as to actuate said primary valve; at least one secondary valve having fluid communication with said primary valve actuator, the first fluid and the second fluid, said at least one secondary valve configured to respond to a command to place said primary valve in any desired state ranging from a fully open state to a fully closed state by applying said pressure differential to said primary valve actuator so as to actuate said primary valve; and a pump in fluid communication with the at least one secondary valve, the pump configured to respond to the command to place the primary valve in any desired state ranging from a fully open state to a fully closed state by applying a pump pressure to the primary valve actuator by way of the at least one secondary valve when the pressure differential alone is not sufficient to cause the primary valve to attain the desired state; commanding that the primary valve be caused to attain a desired state ranging from a fully open state to a fully closed state; and as necessary, causing the pump to apply a pump pressure to the primary valve actuator when the pressure differential is not sufficient to cause the valve to attain the desired state.

In one embodiment, the first pressure and the second pressure are pressures present in a downhole environment of an oil or gas well.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4A is a perspective view of a choke valve for a production zone in an oil well.

FIG. 4B is a side view of the valve shown in FIG. 4A.

DETAILED DESCRIPTION

We describe what is believed to be a novel design of a hydraulic valve control system for high pressure valves. The system takes energy from the in-situ pressure difference across the valve to do the mechanical work to move the valve's gate, stem/plunger, sleeve, or other flow control elements.

In one embodiment the system reduces the required power and establishes novel compact controllers for high pressure valves by using the pressure differential to drive a hydraulic cylinder to move the flow control part of the valve.

The disclosed energy harvesting valves can be used in any system that has a large enough pressure difference that can be used to do work on a valve of suitable size. In the embodiment shown and described, the hydraulic valves are intended for flow control in an oil well downhole where there may exist a significant potential pressure differential across the valve. However, the disclosed invention can also be used in other embodiments such as other applications where high pressure differentials exist.

The novel features of this valve system and method are believed to be:

1. A hydraulic system that uses the ambient pressure difference to provide some or all of the mechanical energy needed to operate and to control a large valve, such as a choke valve, that controls communication between the related two pressure regions.

2. A system comprising a small valve that channels the pressure from two sides of the valve into the chambers of an actuator that operates the valve. In some embodiments the actuator is a hydraulic cylinder.

3. A system comprising a small pump that is able to provide such additional pressure differential as may be needed to operate the choke valve.

4. The disclosed system uses the available energy of the pressure differential to reduce the amount of energy or power required for control of a choke valve used in a high pressure environment. In one embodiment the high pressure environment is an oil well downhole (e.g., the drilled bore in an oil well either underground or undersea).

Figure 1A:
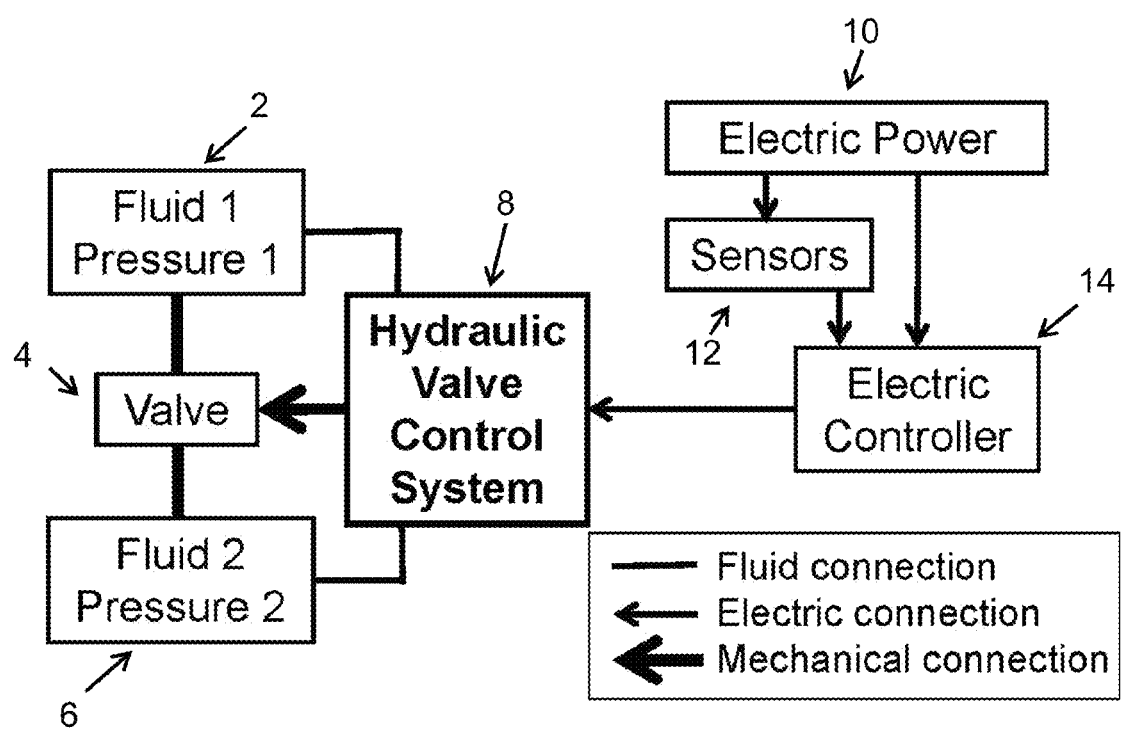
FIG. 1A is a schematic diagram illustrating the connections of a hydraulic valve control system that operates according to principles of the invention to other parts of a fluid flow control valve system.

Turning to FIG. 1A, there is shown a schematic diagram illustrating the connections of a hydraulic valve control system that operates according to principles of the invention to other parts of a fluid flow control valve system. In FIG. 1A, a first fluid source 2 at a first pressure and a second fluid source 6 at a second pressure are each in fluid communication with opposite sides of a valve 4 when the valve is in a fully closed state. When valve 4 is in a partially open state or in a fully open state the fluid at the higher pressure flows from one side of the valve to the other side of the valve (e.g., from the side at the higher pressure to the side at the lower pressure). Hydraulic valve control system 8 is mechanically connected to valve 4, and is capable of operating valve 4 so that valve 4 can be placed in any desired state ranging from a fully open state to a fully closed state. In some embodiments the term "any desired state ranging from a fully open state to a fully closed state" means any state in a continuum of states from a fully open state to a fully closed state, and including any desired partially open state. The first fluid source 2 at a first pressure and the second fluid source 6 at a second pressure are each in fluid communication with the hydraulic valve control system. The subject matter that is presented as patentable subject matter herein deals with the valve 4 and the hydraulic valve control system 8 and their fluid connections to the first fluid source 2 and the second fluid source 6.

In order to explain how the valve 4 and the hydraulic valve control system 8 are made operational, we further describe a source of electrical power 10 (which can be any convenient source of electrical power), one or more sensors 12 (which can be any sensor suitable for measuring pressure, differential pressure, and/or flow) and an electric controller 14 (which can be any convenient electrical controller that can obtain pressure and/or flow data from the one or more sensors 12 and can send commands to the hydraulic valve control system 8 to cause the hydraulic valve control system 8 to operate valve 4 so that valve 4 is placed in any desired state ranging from a fully open state to a fully closed state. For the present application, none of the source of electrical power 10, the one or more sensors 12 and the electric controller 14 are considered to be novel elements, but are simply described by way of illustrating how the valve 4 and the hydraulic valve control system 8 may be operated.

In order to overcome the previously identified problem (e.g., the necessity to provide significant force which requires a large energy expenditure and the use of large actuators) the present invention takes advantage of the in-situ pressure differential to operate valves by providing small valves that can be opened or closed so as to change the pressure on either chamber of a hydraulic cylinder that is connected to the valve's moving element such as a choke. A schematic diagram of an apparatus that embodies a generic solution is shown in FIG. 1B.

Figure 1B:
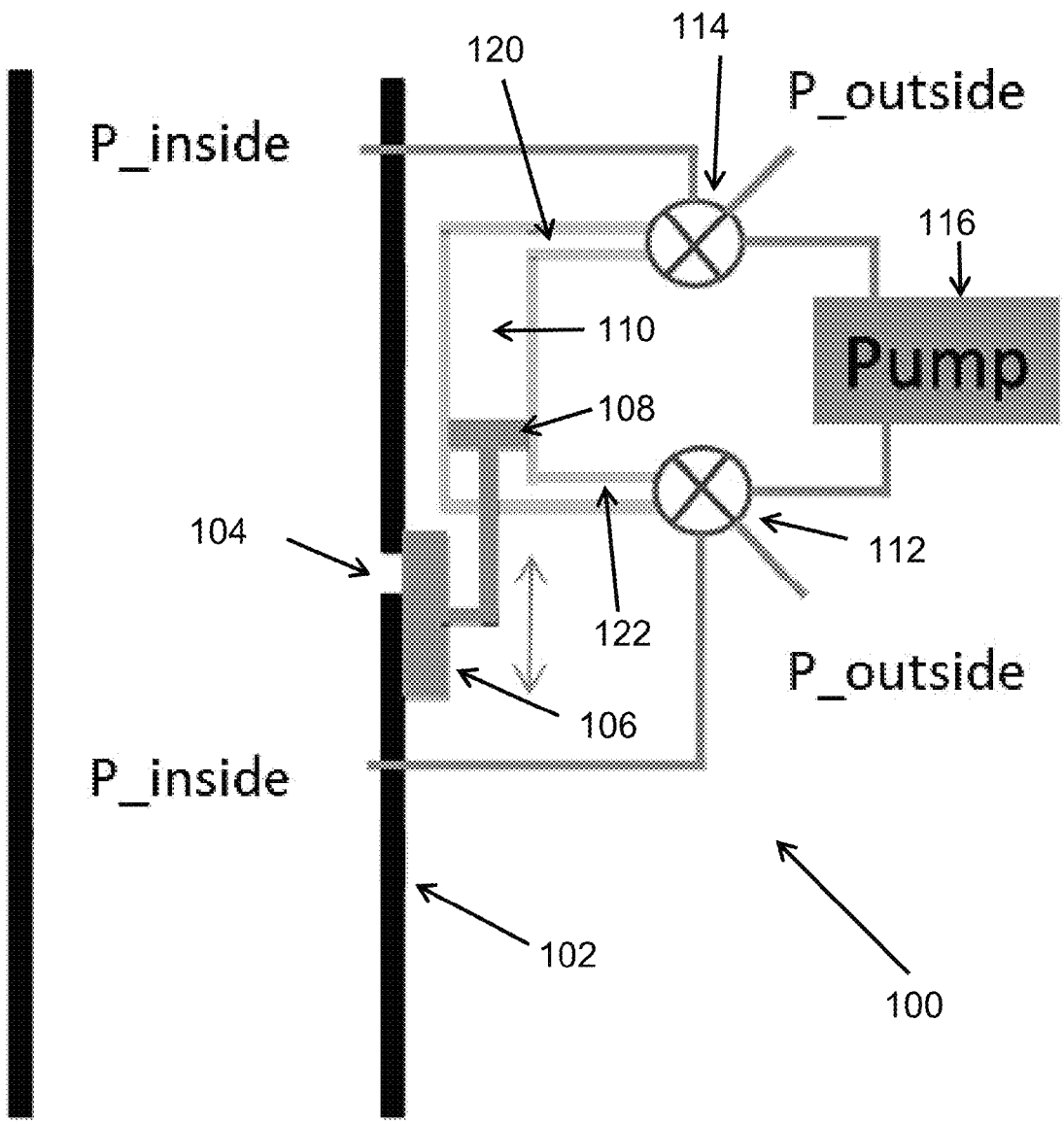
FIG. 1B is a schematic diagram of an embodiment of a valve control system that uses in-situ pressure differentials to operate a linear sleeve valve.

FIG. 1B is a schematic diagram 100 of an embodiment of a valve control system that uses in-situ pressure differentials to operate a linear sleeve valve. In FIG. 1B, pipe 102 contains material at an internal pressure of P_inside and is surrounded by material at a pressure of P_outside. An aperture 104 in the pipe 102 provides controlled communication between the inside and the outside of the pipe 102 with control exercised by slider 106. Slider 106 is the valve that controls the flow from one side of the pipe 103 to the other side, and can be operated so as to cause aperture 104 to be closed (e.g., a fully closed state of the valve), so as to cause aperture 104 to be open (e.g., a fully open state of the valve), or so as to cause aperture 104 to be partially open (e.g., a partially open state of the valve). The aperture 104 and the slider 106 are referred to herein as a unit as the primary valve.

A piston 108 is attached to slider 106 to apply a motive force to the slider. The piston 108 is contained in a linear bore 110 which can be pressurized from either of its two ends by way of ports 120, 122. In the present discussion, the piston 108 and the linear bore 110 are referred to herein as a unit as the actuator of the primary valve. One end of the bore is proximal relative to the slider (the lower end of the bore 110 in FIG. 1B) and the other end is distal relative to the slider (the upper end of the bore 110 in FIG. 1B). When the pressure on the piston 108 is greater from the distal end of the bore, the piston 108 and the slider 106 move in a downward direction, so as to close aperture 104. When the pressure on the piston 108 is greater from the proximal end of the bore, the piston 108 and the slider 106 move in an upward direction, so as to open aperture 104. When the two pressures are balanced (or when the piston 108 reaches one of two terminal positions) the piston 108 stops moving.

The bore 110 is in fluid communication at each end with a respective one of two multiple-port valves 112 and 114. Each of multiple-port valves 112 and 114 has a port that is in communication with the material inside pipe 102 a pressure P_inside and a port that is in communication with the material outside pipe 102 at pressure P_outside. Each of the multiple-port valves 112 and 114 will be referred to herein as a secondary valve. Each secondary valve has its own actuator, such as a motor that can place the secondary valve in any one of a plurality of defined states. In one embodiment, each motor that operates a secondary valve 112, 114 can be operated by electrical power controlled by the electric controller 14.

Each of the multiple-port valves 112, 114 is in fluid communication with a pump 116 by way of a pump port provided in each of the multiple-port valves 112, 114. Pump 116 can take in fluid at a first pressure (Press1) and by pumping the fluid, discharge fluid at a different second pressure (Press2) higher than the first pressure. By use of suitable valving at the pump, the differential so produced given by $\text{Diff}_{pump} = \text{Press2} - \text{Press1}$ can be applied in either of two directions flowing away from the pump, e.g., the differential can be applied at the proximal end of bore 110 or at the distal end of bore 110. Pump 116 has one or more pressure sensors that can measure pressure so as to determine whether $\text{Diff}_{pump}$ needs to be applied, and pump 116 can then act. In the circumstance where one of P_inside and P_outside is larger than the other by a sufficient amount, the piston 108 and the slider can be moved in one direction by simply applying the larger pressure on one side of the piston 108 and the lower pressure on the other side of the piston 108, so that the pressure differential moves the piston 108 in the desired direction, e.g., to open or to close aperture 104. If the difference in pressure between P_inside and P_outside is small enough (or is zero) or if the pressure differential alone is not sufficient to cause the primary valve to attain a desired state, there will not be enough force to move the piston 108 efficiently, so pump 116 can be used to increase the pressure differential so as to cause piston 108 and slider 106 to move in the desired direction. In one embodiment, the pump 116 can be operated by electrical power controlled by the electric controller 14.

The valve control system illustrated in FIG. 1B can be implemented in other embodiments using a rotary valve rather than a linear sleeve valve.

A sleeve valve is mounted on a pipe to control the flow between the inside and outside of the pipe. In the case where a sizable pressure difference exists between the outside and inside of the pipe, one could adjust the pressure in the up or low chamber of the cylinder to be high or low to change the direction of motion of the piston by opening a multi-path valve to expose the chamber to a high pressure or low pressure region. The maximum output force of the cylinder is proportional to the pressure differential and the effective area of the cross-section of the cylinder. With a sufficient effective area, the cylinder actuator is able to overcome the resistance to move the sleeve where the pressure differential is sizable. In the case where the pressure differential is small, a small pump, sized to account for the remaining friction of the valve, can be used to create a pressure to drive the hydraulic cylinder. The operation of this small pump and the multi-path valves requires much lower force/torque and power than that the one required to directly operating the valve against the high pressure.

Figure 2:
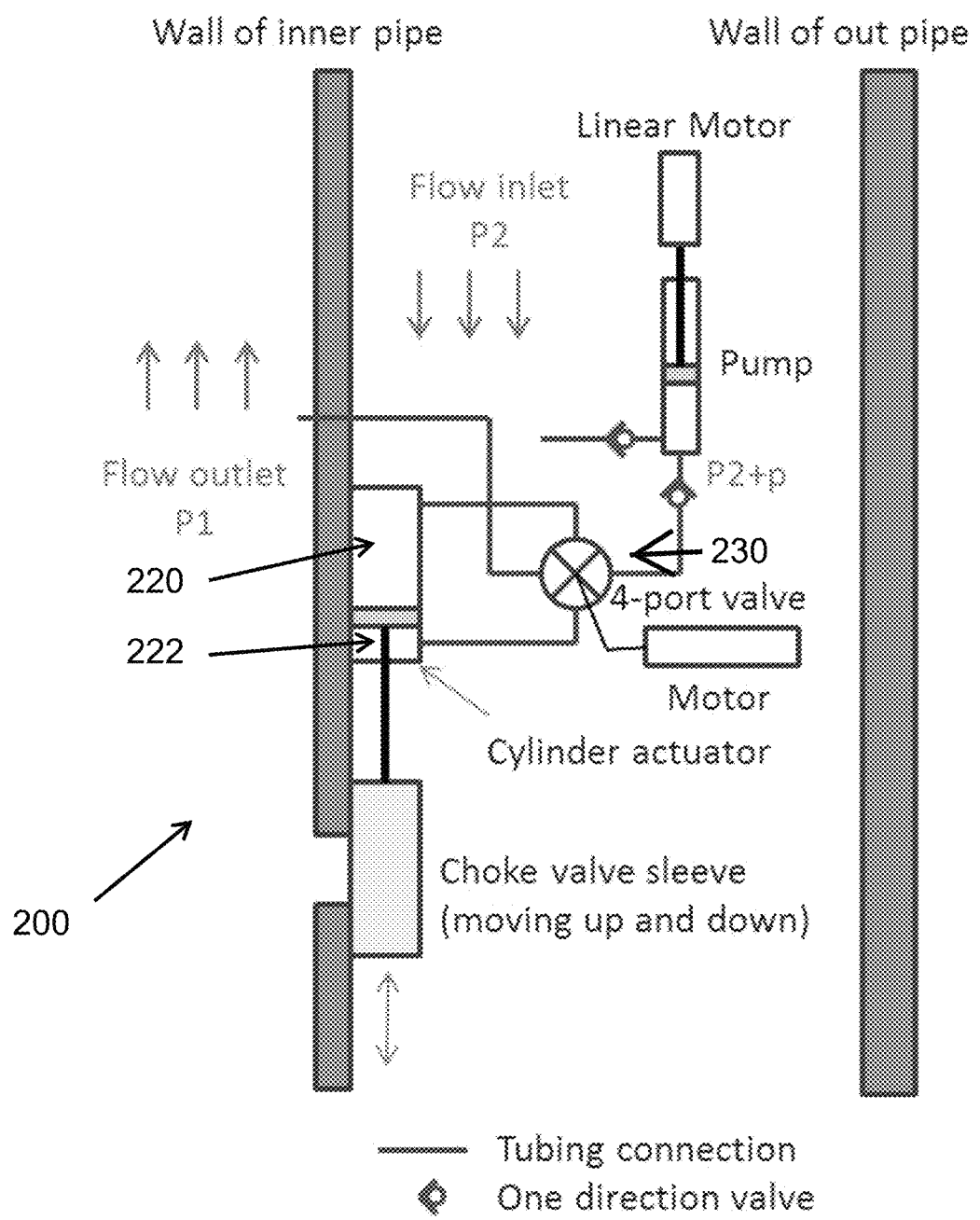
FIG. 2 is a schematic diagram of a hydraulic valve control system for an in-situ choke valve in an oil well downhole.

One embodiment of the specific solution for application to oil downhole flow control is disclosed in FIG. 2. FIG. 2 is a schematic diagram of a hydraulic valve control system 200 for an in-situ choke valve in an oil well downhole.

One difference between the embodiment of FIG. 1B and the embodiment of FIG. 2 is that in FIG. 1B there are two secondary valves 112, 114 and in FIG. 2 there is only one secondary valve 230.

The system comprises a 4-port valve 230 that is able to connect the pressure of inlet P2 and outlet P1 to a cylinder actuator to drive a sleeve choke valve that controls the flow from outside of the inner pipe to inside the inner pipe. A pump is inserted into the high pressure (P2) connection line in order to produce additional pressure difference of p and increase the P2 to P2+p in case the pressure difference P=P2−P1 is not large enough. In this configuration, the 4-port valve 230 has 3 positions for 3 different outcomes:

1. Connect P2+p to the upper piston chamber 220 of the cylinder and P1 to the lower piston chamber 222 to move the piston downward.
2. Turn all connections off to hold the piston.
3. Connect P2+p to the lower piston chamber 222 of the cylinder and P1 to the upper piston chamber 220 to move the piston upward.

An example of the design parameters for assumed requirements and estimated performance based on a system with 3 actuator cylinders and a pump is given in Table 1.

TABLE 1

|  | Total A (cm^2) | D (cm) | ΔPmax (MPa) | ΔPmax (psi) | Efficiency | F_ΔP = 0 (N) | F_ΔPmax (N) | Strok (cm) | Acting T (s) |
|---|---|---|---|---|---|---|---|---|---|
| Actuator Cylinder | 8.551 | 1.905 | 41.37 | 6000 | 0.85 | 3007 | 33075 | 15 | 300 |

|  | A (cm^2) | d (cm) | Δp_max (MPa) | Δp_max (psi) | Efficiency | F_driving (N) | Speed (cm/s) | Power (W) |
|---|---|---|---|---|---|---|---|---|
| Pump | 0.079 | 0.3175 | 4.137 | 600 | 0.5 | 66 | 5.40 | 3.54 |

Figure 3:
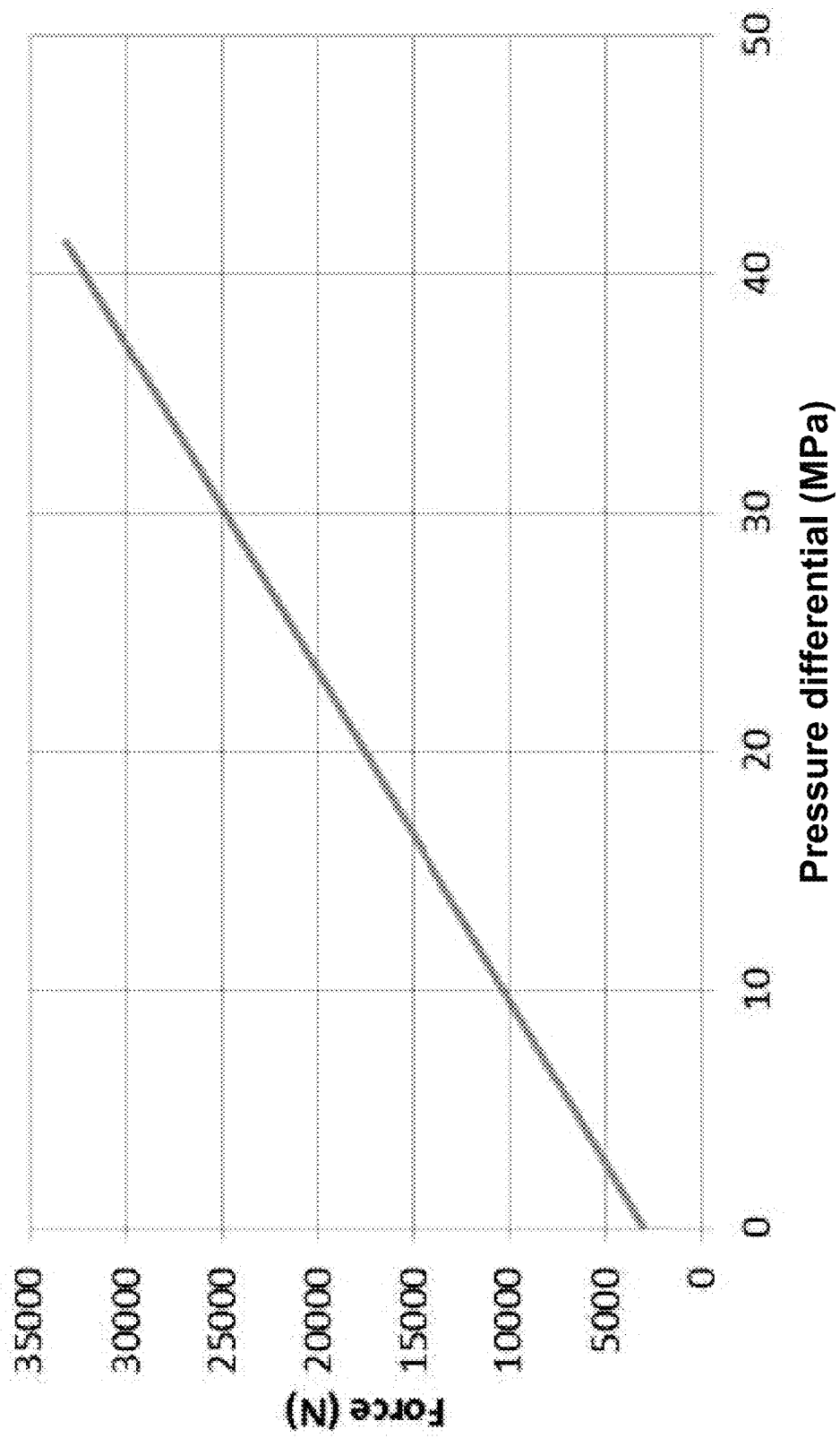
FIG. 3 is a graph that illustrates the estimated maximum force on a cylinder actuator as a function of pressure differential.

For the purposes of this calculation, it is assumed that the required maximum working pressure differential of the valve is 4.137 MPa (6000 psi). The diameter of the actuator cylinders is 1.905 cm (¾") and the total effective area of the three cylinders is 8.551 cm². The pump can produce up to 41.37 MPa (600 psi) which is 1/10 of the maximum working pressure differential. The mechanical efficiency of the actuator cylinders is assumed to be 0.85 taking into account the friction loss in the cylinders. The estimated maximum output force of the cylinders is shown in FIG. 3 as a function of the pressure differential. The output force range is from 3007 N under zero pressure differentials to 33075 N under the maximum pressure differential. Generally, the needed force to operate a valve also varies and increases with the pressure differential. The actuator cylinders in this example are able to operate valves with needed force below the curve in FIG. 3.

FIG. 3 is a graph that illustrates the estimated maximum force on a cylinder actuator as a function of pressure differential.

The moving speed of the cylinder actuator or piston is dependent on the flow rate to the cylinder. When the force generated by the inlet-outlet pressure differential is large enough to drive the valve the pump does not need to be activated and the flow rate is controlled by the 4-port valve. In the case that the pump needs to produce additional pressure to operate the choke valve, the flow rate will be limited by the pumping rate. Assuming the stroke of the choke valve from full open to close is 15 cm and an operating time of the valve is expected to be no more than 5 minutes, the corresponding flow rate is 0.43 cm³/s. If a pump has a piston diameter of 0.3125 cm (⅛") and an efficiency of 0.5, the calculated driving force to generate 4.137 MPa pressure is 66 N, the driving speed is 5.4 cm/s for the required flow rate, and the maximum driving power is 3.54 W. The force/torque and power to operate the 4-port valve is expected to be small due to the fact that the flow rate that needs to be controlled is very low.

The data listed in Table 1 show that the overall design of the control system is feasible at very low input power levels, namely 3.5 W during operation. This could be enabling for applications with very limited power availability such as an oil well downhole location working off of stored energy or small amounts of locally generated (in situ) power.

We modeled some of the components of the design in CAD to determine how such a valve can be accommodated as to form and fit in the production zone of an oil well. The design of one embodiment is shown in FIG. 4A and FIG. 4B. FIG. 4A is a perspective view of a choke valve for a production zone in an oil well. The rightmost section 410 is the choke valve that controls flow from inside the light brown section to the dark brown section. The valve control cylinder 420 is the left section and the piston is shown as a ring.

FIG. 4B is a side view of the valve shown in FIG. 4A.

This specific design shows a sleeve valve 410 (pink) that is actuated by an annular piston 460. A small actuator 470 (blue box) controls a hydraulic pump 480 (purple). The hydraulic pump has a choke valve connecting the casing pressure to the pump. A fluid from the choke valve on the outlet flows to a 4-port valve 490 that is driven by a small actuator 495 (small blue cylinders). This actuator can route the sum of the casing and pump pressure to either the left or right volumes of the annular piston and in turn can move the sleeve valve to the left or the right exposing the outlet ports.

Figure 5A:
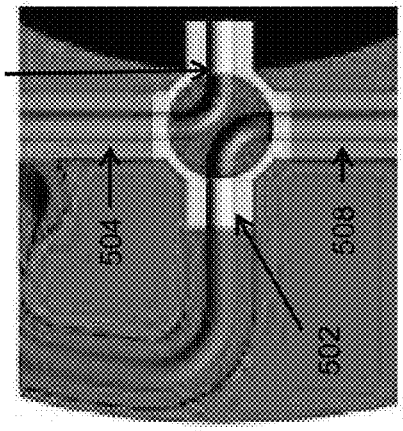
FIG. 5A is a plan view of a 4-port valve for diverting pressure to different regions of 4 connected pipes with all lines shut off.

FIG. 5A is a plan view in close up of a 4-port valve for diverting pressure to different regions of 4 connected pipes with all lines shut off.

Figure 5B:
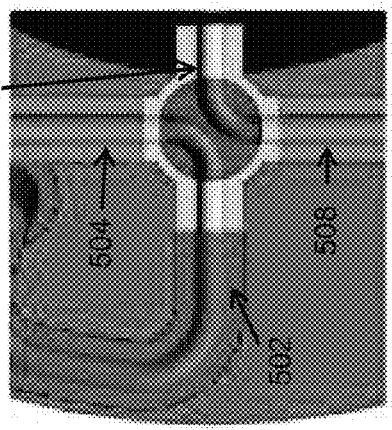
FIG. 5B is a plan view of the value with two pairs of lines connected.

FIG. 5B is a plan view of the value with two pairs of lines connected (line 502 to line 504 and line 506 to line 508).

Figure 5C:
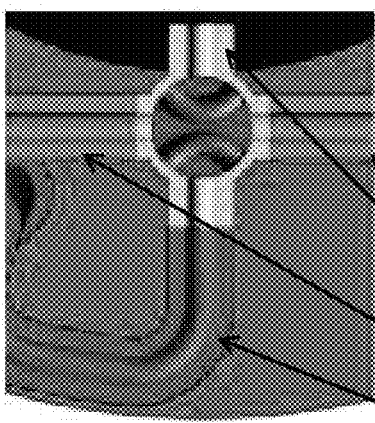
FIG. 5C is a plan view of the value with two different pairs of lines connected.

FIG. 5C is a plan view of the value with two different pairs of lines connected (line 502 to line 508 and line 504 to line 506).

Figure 5D:
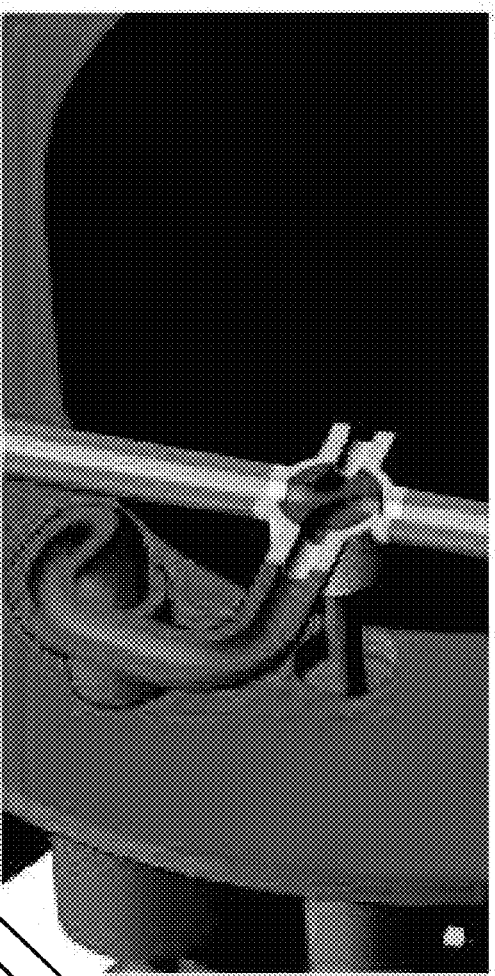
FIG. 5D is a perspective view of the 4-port valve.

FIG. 5D is a perspective view of the 4-port valve.

An additional bleed valve could be added between the casing and inner tube to remove/reduce the pressure difference across the choke valve that can be operated when the choke valve is closed.

Figure 6:
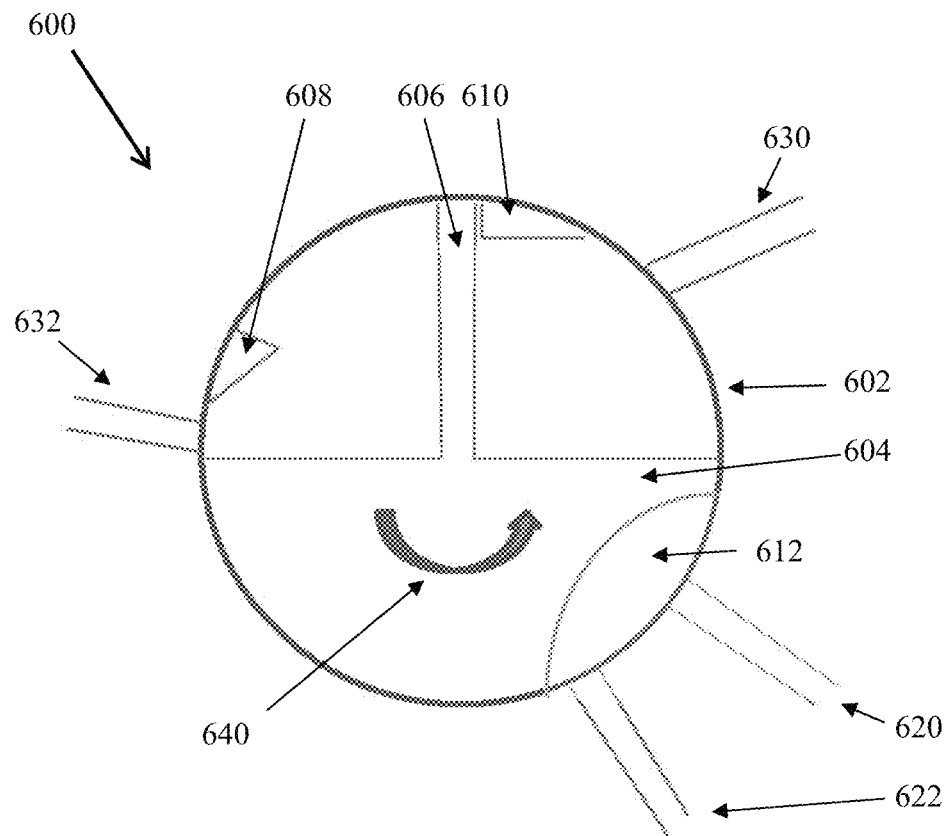
FIG. 6 is a plan view of a rotary valve that operates according to principles of the invention.

FIG. 6 is a plan view of a rotary valve that operates according to principles of the invention. In one embodiment the rotary valve 600 would be expected to have a plurality of ports 620, 622 entering a valve body 602 (for example entering in radial directions), a rotary valve element 604 configured to connect selected ones of the ports and configured to disconnect some or all of the ports based on a rotary position of the rotary valve element 604 relative to the valve body 602, and a rotary actuator (indicated by arrow 640), The rotary actuator is configured to turn the rotary valve element 604. Although arrow 640 is shown as a unidirectional arrow, it should be understood that the rotary valve element 604 can be turned in either of two angular directions.

The rotary valve element 604 has a vane 606 that limits the rotation of the rotary element by interference with detents 608, 610 attached to the valve body, so that the rotary element can only rotate within a defined angular displacement. In the drawing of FIG. 6 as shown, with vane 606 adjacent detent 610, a cavity 612 defined in the rotary element 604 is positioned so that there is communication within the valve body 602 between ports 620 and 622 (e.g., the valve is opened'. When the vane 606 is positioned adjacent detent 608, the rotary body has rotated sufficiently that cavity 612 is displaced away from at least one of ports 620 and 622, and those ports are disconnected (e.g., the valve is closed).

The valve 600 also has at least two input ports 630, 632 each configured to receive a fluid at a pre-determined pressure so that a pressure differential applied to the rotary actuator causes the rotary valve to turn to connect or to disconnect the selected ones of the ports. For example, ports 630, 632 in FIG. 6 could be connected as are ports 120, 122 in FIG. 1B to pressure sources P_inside and P_outside and a pump 116 using valve such as valves 112 and 114 of FIG. 1B.

Figure 7:
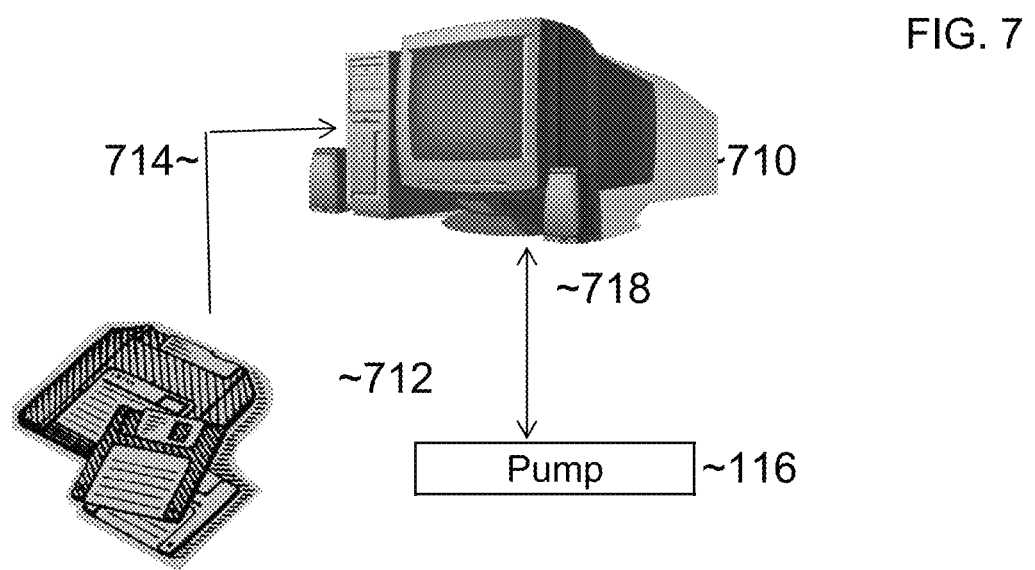
FIG. 7 is a schematic diagram of a control apparatus for a hydraulic valve control system.

FIG. 7 is a schematic diagram of a controller in communication with a pump 116. As illustrated in FIG. 7, in one embodiment the controller is a computer-based controller 710, such as a general purpose programmable computer that can be programmed with instructions recorded in a non-volatile manner on a machine-readable medium 712 such as a magnetic disk. The instructions can be communicated from the machine-readable medium 712 to the computer-based controller 710, for example as illustrated by arrow 714, which can denote that the machine-readable medium 712 is physically connected to the computer-based controller 710, or is in electronic communication with the computer-based controller 710.

When operating on the computer-based controller 710, the instructions recorded in non-volatile fashion on the machine-readable medium 712 define methods of operating a pump 116. Communication between the computer-based controller 710 and pump 116 can be performed using any convenient digital protocol, for example any of the IEEE 702 protocols, the International Telecommunications Union (ITU) H.323 protocol, or the Integrated Services Digital Network (ISDN) protocol. The bi-directional communication can be by way of a wired electrical connection, a wireless connection, a fiber optic connection, or any other conventional communication connection. The physical distance between controller 710 and pump 116 can be any convenient distance.

The computer-based controller 710 can receive instructions or commands from a user, who can issue such instructions or commands using a device such as a keyboard, a mouse, a touchscreen or any convenient human interface device that communicates with the computer-based controller 710.

The user can be situated proximate to the computer-based controller 710, or can be remote from the computer-based controller 710 and connected to the computer-based controller 710 using a packet-based communication system such as the Internet.

The computer-based controller 710 can include a display. If a user is proximate to the computer-based controller 710, the display can be used to show the user the progress of the communications that are taking place. If the user is remote from the computer-based controller 710, the information to be displayed can be communicated to a display proximate to the user's location. In particular, either display can be configured to display to the user information indicative of the communications that are taking place.

Figure 8:
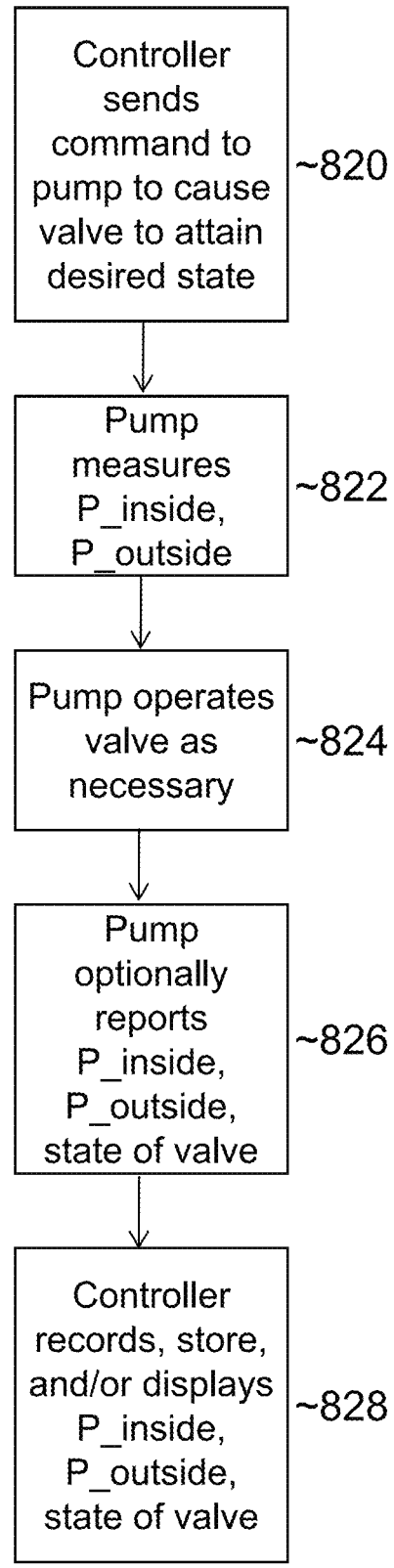
FIG. 8 is a schematic flow diagram of a control and data collection process.

FIG. 8 is a schematic flow diagram of a control and data collection process. As illustrated in FIG. 8, at step 820 a command is issued by a controller, such as the computer-based controller 810. The command can be in response to a directive from a user, or it can be issued based on an instruction in a set of instructions recorded on machine-readable medium 812. The command directs pump 116 to cause a valve to attain a desires state, such as an open state or a closed state. At step 822 pump 116 measures P_inside and P_outside to determine if it needs to operate so as to cause the valve to attain the desired state. At step 824 pump 116 operates the valve as necessary to cause it to attain the desired state. At step 826 the pump 116 optionally reports one or more of P_inside, P_outside, and the state of the valve. At step 828 the reported data is recorded, and/or stored, and/or displayed.

DEFINITIONS

Unless otherwise explicitly recited herein, any reference to an electronic signal or an electromagnetic signal (or their equivalents) is to be understood as referring to a non-transitory electronic signal or a non-transitory electromagnetic signal.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A hydraulic valve control system for use in the presence of a pressure differential, comprising:
   a primary valve connected to a primary valve actuator, the primary valve actuator configured to receive a first fluid having a first pressure at a port and a second fluid having a second pressure at another port, the difference between said first pressure and said second pressure defining a pressure differential, the primary valve actuator configured to respond to said pressure differential so as to actuate said primary valve;
   at least one secondary valve having fluid communication with said primary valve actuator, the first fluid and the second fluid, said at least one secondary valve configured to respond to a command to place said primary valve in any desired state ranging from a fully open state to a fully closed state by applying said pressure differential to said primary valve actuator so as to actuate said primary valve; and
   a pump in fluid communication with said at least one secondary valve, said pump configured to respond to said command to place said primary valve in any desired state ranging from a fully open state to a fully closed state by applying a pump pressure to said primary valve actuator by way of said at least one secondary valve when said pressure differential alone is not sufficient to cause said primary valve to attain said desired state.

2. The hydraulic valve control system of claim 1, wherein said primary valve is a linear valve.

3. The hydraulic valve control system of claim 1, wherein said primary valve is a rotary valve.

4. The hydraulic valve control system of claim 1, wherein said primary valve actuator is at least one hydraulic cylinder.

5. The hydraulic valve actuator of claim 4, wherein one of said at least one hydraulic cylinder is annular in cross-section.

6. The hydraulic valve control system of claim 1, wherein said primary valve actuator is at least one pneumatic cylinder.

7. The hydraulic valve actuator of claim 6, wherein one of said at least one pneumatic cylinder is annular in cross-section.

8. The hydraulic valve control system of claim 1, wherein said pump is located in fluid communication between said primary valve actuator and said secondary valve.

9. The hydraulic valve control system of claim 1, wherein said pump is located in fluid communication between the first or second fluid and said secondary valve.

10. The hydraulic valve control system of claim 1, wherein said pump is located in fluid communication between two ports of said secondary valve.

11. The hydraulic valve control system of claim 1, wherein said pump is located in fluid communication between two ports of said primary valve actuator.

12. The hydraulic valve control system of claim 1, configured to be used in a downhole environment of an oil or gas well.

13. A method of controlling a valve in the presence of a pressure differential, comprising the steps of:
   providing a hydraulic valve control system, comprising:
      a primary valve connected to a primary valve actuator, the primary valve actuator configured to receive a first fluid having a first pressure at a port and a second fluid having a second pressure at another port, the difference between said first pressure and said second pressure defining a pressure differential, the primary valve actuator configured to respond to said pressure differential so as to actuate said primary valve;

at least one secondary valve having fluid communication with said primary valve actuator, the first fluid and the second fluid, said at least one secondary valve configured to respond to a command to place said primary valve in any desired state ranging from a fully open state to a fully closed state by applying said pressure differential to said primary valve actuator so as to actuate said primary valve; and a pump in fluid communication with said at least one secondary valve, said pump configured to respond to said command to place said primary valve in any desired state ranging from a fully open state to a fully closed state by applying a pump pressure to said primary valve actuator by way of said at least one secondary valve when said pressure differential alone is not sufficient to cause said primary valve to attain said desired state;

commanding that said primary valve be caused to attain a desired state ranging from a fully open state to a fully closed state;

and as necessary, causing said pump to apply a pump pressure to said primary valve actuator when said pressure differential is not sufficient to cause said valve to attain the desired state.

14. The method of controlling a valve in the presence of a pressure differential of claim 13, wherein said first pressure and said second pressure are pressures present in a downhole environment of an oil or gas well.

\* \* \* \* \*